No. 819,150. PATENTED MAY 1, 1906.
J. L. MAHONEY.
DIE FOR MAKING ORNAMENTED PLASTIC ARTICLES.
APPLICATION FILED OCT. 15, 1904.

WITNESSES:
H. H. Lamb
S. W. Atherton

INVENTOR
Jeremiah L. Mahoney
BY
A. M. Wooster
ATTORNEY

UNITED STATES PATENT OFFICE.

JEREMIAH L. MAHONEY, OF NAUGATUCK, CONNECTICUT.

DIE FOR MAKING ORNAMENTED PLASTIC ARTICLES.

No. 819,150.     Specification of Letters Patent.     Patented May 1, 1906.

Application filed October 15, 1904. Serial No. 228,537.

*To all whom it may concern:*

Be it known that I, JEREMIAH L. MAHONEY, a citizen of the United States, residing at Naugatuck, county of New Haven, State of Connecticut, have invented a new and useful Die for Making Ornamented Plastic Articles, of which the following is a specification.

My invention has for its object to provide dies for making ornamented plastic articles that will produce the articles continuously and complete ready for the market.

Heretofore, so far as I am aware, solid articles made from plastic soft rubber and similar compounds have been formed entirely by the process of molding. The novel dies which form the subject of my present invention enable me to produce these articles continuously without molding, thereby greatly reducing the cost of production, as the plastic compound simply has to be forced through the dies in the same manner that unornamented articles have heretofore been made. In the present instance I have illustrated the application of my invention to the production of an ornamented rubber binding-strip having a rib or bead at both edges. It will of course be understood, however, that the invention is in no way limited to this special application, but that the principle of the invention may be utilized with equal success in the production of dies that will produce any required ornamental form from a plastic-rubber compound.

Figure 1:
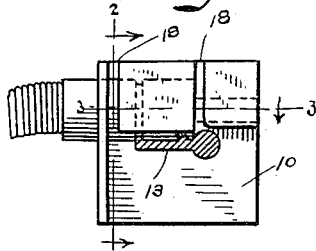
Figure 2:
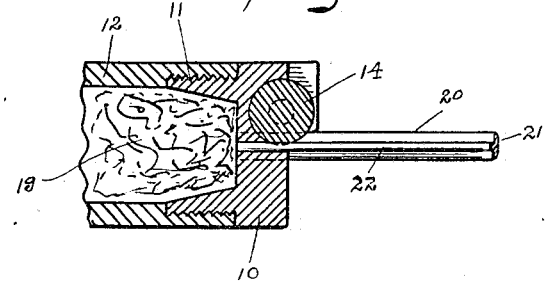
Figure 3:
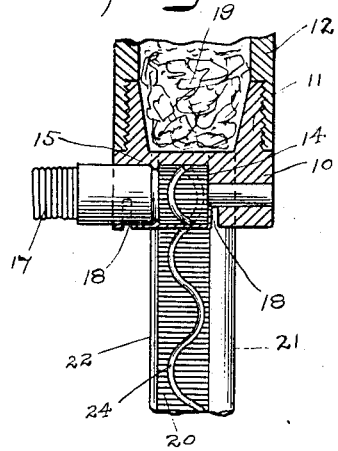
Figure 4:
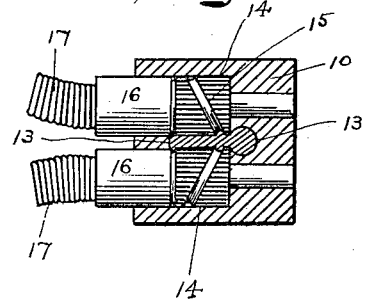
Figure 5:
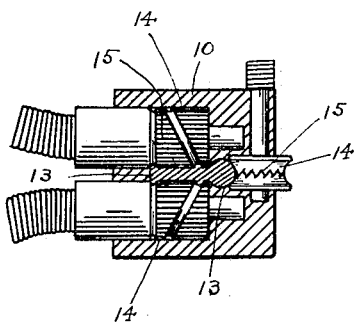

In the drawings, Figure 1 is an elevation illustrating one form of my novel dies as in use in the production of an ornamented rubber binding-strip, the strip being shown in section as it issues from the die, one ornamenting-roller only being used; Fig. 2, a longitudinal section on the line 2 2 in Fig. 1 looking toward the right; Fig. 3, a longitudinal section on the line 3 3 in Fig. 1 looking down; Fig. 4, a transverse vertical section illustrating a form of the invention in which two ornamenting-rollers are used, and Fig. 5 is a similar section illustrating a form of the invention in which three ornamenting-rollers are used.

10 indicates the body of the die, which is provided on its rear face with an externally-threaded hub 11, to which a conducting-tube 12 may be attached, the inner side of the hub being shown as converging inward toward the die-opening, which is indicated by 13.

14 denotes ornamenting-rollers, one, two, or more of which may be used and which are socketed in the body, the operative faces of the rollers extending into the die-opening sufficiently to produce the desired ornamentation on the plastic compound as it is forced through the die-opening. These rollers are ornamented in intaglio to produce upon the surface of the compound as it is forced through the die-opening the desired ornamentation in cameo, the ornamentation of the rollers being indicated by 15.

20 denotes an article that is being formed, in the present instance a binding-strip, which is provided on its edges with ribs or beads 21 and 22, shown in the present instance as dissimilar in size. The ornamentation upon the article as produced by an ornamenting-roller is indicated by 24.

In practice the rollers are driven in any preferred manner, as by providing the shanks 16 with belt-pulleys or gear-wheels or by attaching thereto flexible shafts 17, as indicated in the drawings.

18 denotes slots in the face of the die, which may be provided as a clearance for convenience in use.

The operation will be readily understood from the drawings. The plastic compound, which I have indicated by 19, is forced through the die in the ordinary manner, the speed at which the rollers are driven being regulated to correspond with the speed at which the compound is passing through the die and so as to produce the desired ornamentation on the article that is being formed. As has been stated, the article produced by this die is continuously formed as long as the compound is supplied and forced through the die-opening 13. The resulting strip has its general shape in cross-section determined by the shape of the opening 13, and such shape may vary to any extent, as is obvious. While the general cross-sectional shape of the strip is formed by the die-opening, the surface ornamentation of the strip is imparted by the roller or rollers, which extend into the die-opening only sufficiently to impart the surface ornamentation desired. There is therefore a coaction between the die-opening which shapes the product and the roller or rollers which ornament the strip.

Each roller 14 is fitted closely but not tightly in the socket 25, formed therefor in the body 10. In the working of rubber, as herein referred to, the material is at such a temperature that it is very soft and sticky, and if there were any opportunity for the escape of the material behind the roller it would be forced out to a considerable extent at a point where it would interfere with the proper operation of the die. By providing the body of the die with a socket 25 and fitting the ornamenting-roller in said socket the escape of the material is prevented except at the shaping-opening. Moreover, the ornamenting-roller is left practically free of any coating, and therefore capable of imparting perfect ornamentation, according to the surface design of said roller.

The socket 25 embraces at least substantially half of the body of the roller, and said roller fits closely therein. For this reason the inner surfaces of the socket coact with the close face of the roller and practically form a dam to prevent backward movement of the rubber compound.

Having thus described my invention, I claim—

1. A die for making ornamental plastic strips consisting of a body having a socket for a roller and provided with a die-opening for shaping the compound to strip form, and an ornamenting-roller fitting closely in the socket of the body and extending into the die-opening whereby the article formed in the die-opening is ornamented by the roller, the said socket embracing at least substantially half of the roller-body.

2. In a die of the character described, the combination with a body having a socket for a roller and having a die-opening for shaping the compound to strip form, of means for conducting a plastic compound to said opening, an ornamenting-roller fitting closely in the socket of the body and extending into the die-opening to ornament the strip formed by said die-opening, and means for driving said roller, the said socket embracing at least substantially half of the roller-body.

In testimony whereof I affix my signature in presence of two witnesses.

JEREMIAH L. MAHONEY.

Witnesses:
A. M. WOOSTER,
S. W. ATHERTON.